United States Patent
Monsanto

(10) Patent No.: US 8,595,086 B2
(45) Date of Patent: *Nov. 26, 2013

(54) TIME-VARYING COST-OF-BID ELECTRONIC AUCTION SYSTEM

(76) Inventor: Raphael A. Monsanto, Grosse Pointe, MI (US)

(*) Notice: Subject to any disclaimer, the term of this patent is extended or adjusted under 35 U.S.C. 154(b) by 75 days.

This patent is subject to a terminal disclaimer.

(21) Appl. No.: 13/253,049

(22) Filed: Oct. 4, 2011

(65) Prior Publication Data
US 2012/0030056 A1    Feb. 2, 2012

Related U.S. Application Data

(63) Continuation-in-part of application No. 12/456,590, filed on Jun. 17, 2009, now Pat. No. 8,032,422, which is a continuation of application No. 10/842,951, filed on May 10, 2004, now abandoned, which is a continuation of application No. 09/668,819, filed on Sep. 21, 2000, now abandoned.

(60) Provisional application No. 60/155,301, filed on Sep. 21, 1999.

(51) Int. Cl.
G06Q 30/00 (2012.01)
G06Q 30/06 (2012.01)
G06Q 30/08 (2012.01)

(52) U.S. Cl.
CPC ............ *G06Q 30/0605* (2013.01); *G06Q 30/08* (2013.01)
USPC ........................................ 705/26.2; 705/26.3

(58) Field of Classification Search
USPC ........................................ 705/26.1, 26.2, 26.3
See application file for complete search history.

(56) References Cited

U.S. PATENT DOCUMENTS 6,260,024 B1 *    7/2001    Shkedy ........................... 705/37

OTHER PUBLICATIONS

McHugh, Josh, "Consumer Collusion!" Forbes, New York, Sep. 6, 1999, vol. 164, iss. 5, p. 222.*
Sinton, Peter, "E-Tailer Wins Backing of Marc Andreessen: Accompany Offers Discounts Based on Number of Buyers," San Francisco Chronicle, CA, Jul. 30, 1999, p. B1.*

* cited by examiner

*Primary Examiner* — Amee A Shah
(74) *Attorney, Agent, or Firm* — Rohm & Monsanto, PLC

(57) ABSTRACT

A method of transacting sales over a computerized network defining a product desired to be purchased by a plurality of purchasers. A plurality of database records are produced and stored, each corresponding to a correlation between the product and a respective one of the purchasers. A cost-of-bid price is calculated in response to a first time rate at which the plurality of database records are accumulated in the database memory during the storing. The process is repeated to produce a cost-of-bid price that varies in time in response to the time rate of accumulation of the database records.

6 Claims, 6 Drawing Sheets

TIME VARYING COST-OF-BID PRICE

PURCHASER INTERFACE

ADMINISTRATIVE PURCHASER/VENDOR INTERFACE

PURCHASER POOL FORMATION DETERMINATION

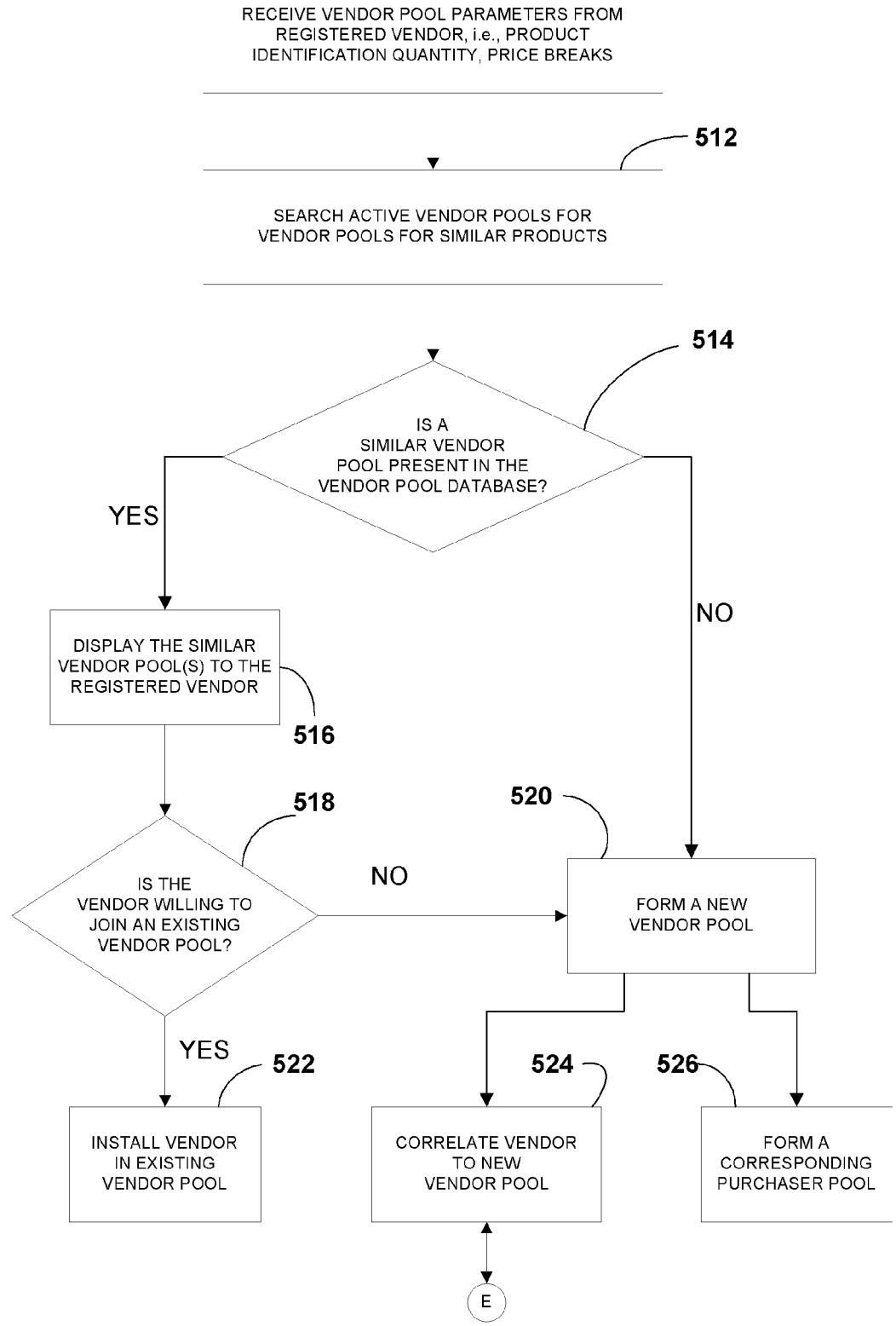

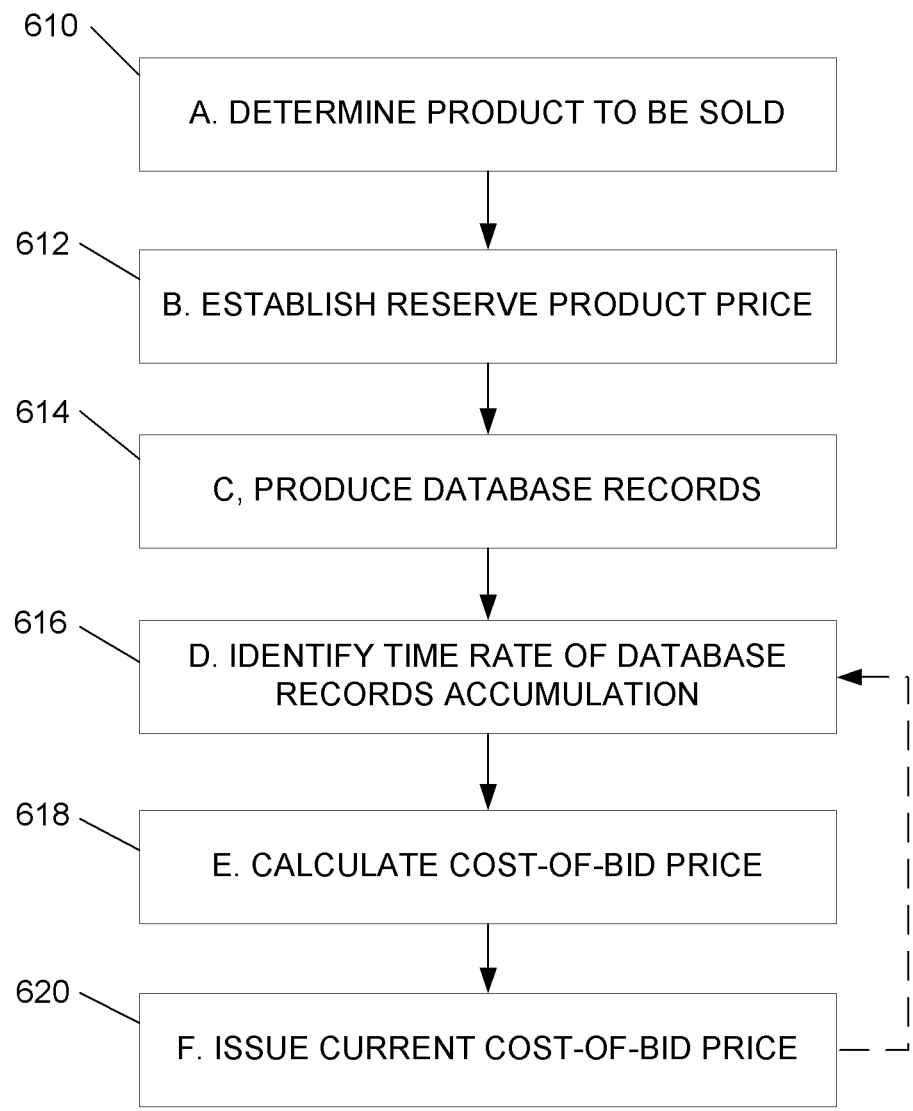

TIME-VARYING COST-OF-BID ELECTRONIC AUCTION SYSTEM

RELATIONSHIP TO OTHER APPLICATIONS

This application is a continuation-in-part patent application of U.S. patent application Ser. No. 12/456,590, filed Jun. 17, 2009 now U.S. Pat. No. 8,032,422, which is a continuation of U.S. patent application Ser. No. 10/842,951, filed May 10, 2004 now abandoned, which is a continuation of U.S. patent application Ser. No. 09/668,819, filed Sep. 21, 2000 now abandoned, which claims the benefit of the filing date of U.S. Provisional Patent Application Ser. No. 60/155,301, filed Sep. 21, 1999, the disclosure of which are incorporated herein in their entirety by reference.

BACKGROUND OF THE INVENTION

1. Field of the Invention

This invention relates generally to systems for conducting commercial transactions over a computerized network, and more particularly, to a system wherein buyers pay to bid on products being auctioned, the cost-of-bidding being responsive to the time rate of accumulation of bids.

2. Description of the Related Art

Conventional auction arrangements are generally directed toward increasing the price at which the auctioned goods are sold by causing the buyers to bid against each other. There is a need, however, for a system of conducting sales of products and services whereby buyers are given incentive to bid early during an auction by increasing the cost-of-bid price as a function of the time rate at which bids are accumulated.

There is additionally a need to establish a reserve price that is determined in relation to actual manufacturers' suggested retail price ("MSRP") or actual prices at which such products or services are available from other vendors ("Street Prices"), and actual price trends and price break points.

There is yet another need for an electronic auction system wherein bidders are motivated to place bids early during the auction cycle.

SUMMARY OF THE INVENTION

A method of transacting sales over a computerized network, the method comprising the steps of:

defining a product desired to be purchased by a plurality of purchasers;

calculating a first cost-of-bid price;

producing a plurality of database records, each corresponding to a correlation between the product and a respective one of the purchasers;

storing the plurality of database records in a database memory;

identifying a first time rate at which the plurality of database records are accumulated in the database memory during performance of said step of storing; and calculating a second cost-of-bid price responsive to the time rate identified in said step of identifying a time rate.

In one embodiment of this method aspect of the invention, there are further provided the steps of:

identifying a second time rate at which the plurality of further database records are accumulated in the database memory; and calculating a third cost-of-bid price responsive to the second time rate identified in said step of identifying a second time rate.

BRIEF DESCRIPTION OF THE DRAWING

Comprehension of the invention is facilitated by reading the following detailed description, in conjunction with the annexed drawing, in which:

FIG. 5 is a simplified function block representation of a specific illustrative embodiment of the invention wherein a vendor is afforded an opportunity to enter a vendors' pool or to cause formation of a new vendor pool; and FIG. 6 is a simplified function block representation of a specific illustrative embodiment of the invention wherein a cost-of-bid price is determined as a function of the time rate of accumulation of database records.

DETAILED DESCRIPTION

Figure 1:
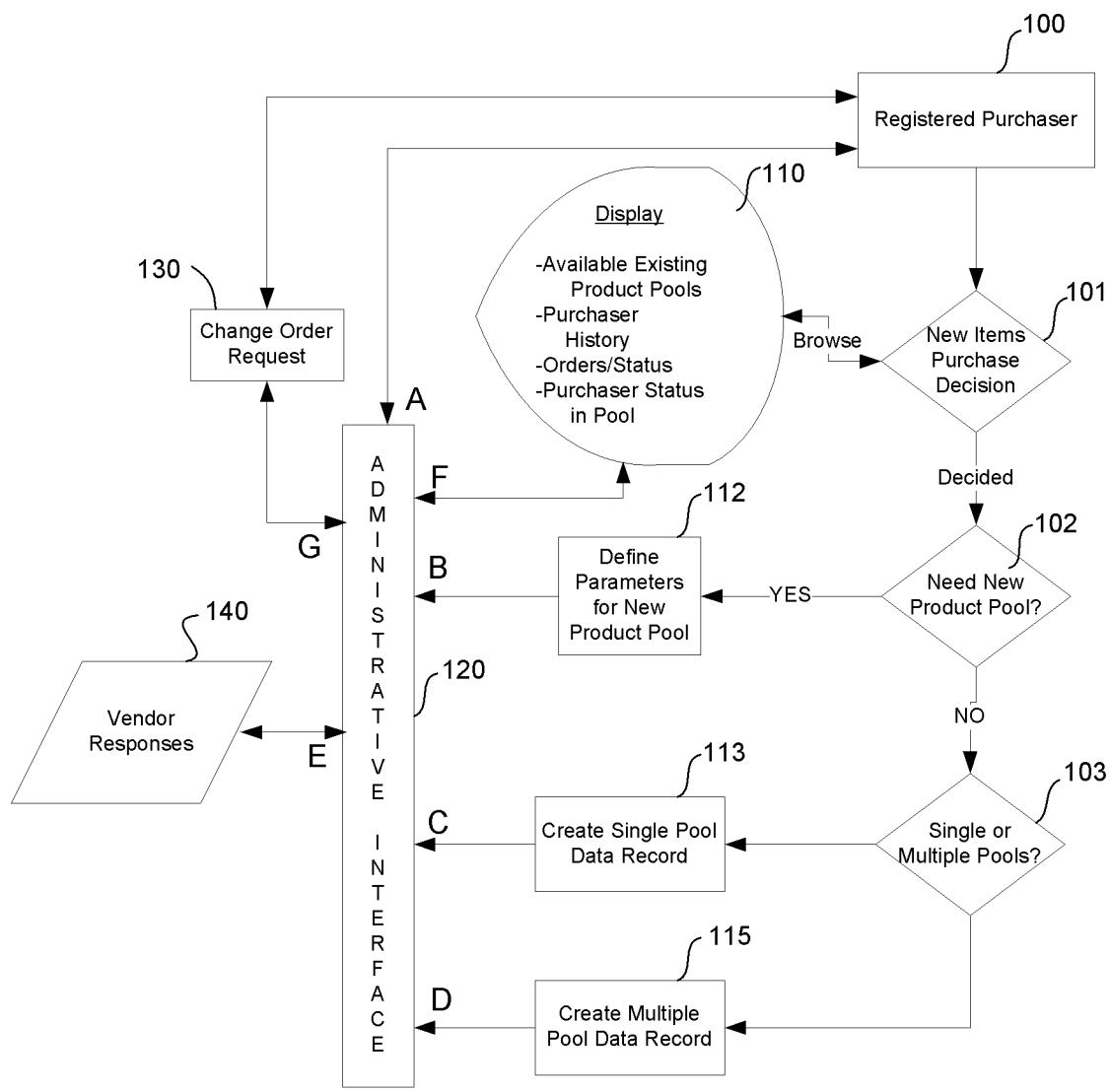
FIG. 1 is a simplified function block representation of a specific illustrative embodiment of the invention wherein a purchaser is afforded an opportunity to enter one or more purchasers' pools.

FIG. 1 is a simplified function block representation of a specific illustrative embodiment of the invention wherein a registered purchaser 100 is afforded an opportunity to enter one or more purchasers' pools, each such pool being directed to achieve increased purchasing power based on pooled quantities to be purchased, for a defined product type. For purposes of the present discussion, it is assumed that each purchaser has been registered, including receipt by the system administrator (not shown in this figure) of payment information, and there has been formed an enforceable purchase contract (offer and acceptance) between the purchaser and the system administrator, including mutual manifestations of intent to a determined set of terms, upon which, as will be described below, the system administrator reasonable can rely to issue purchase offers to, and enter into binding purchase commitments with, vendors.

As shown in this figure, registered purchaser 100 engages in a decision process by which he or she determines at decision block 101 the product(s) desired to be purchased. In making the decision, the registered purchaser can browse, using a display 110, one or more predefined product types that are stored in a database (not shown) in an administrative interface 120. Registered purchaser 100 communicates with administrative interface 120 at a data port "A" of the administrative interface. Information is exchanged between display 110 and administrative interface 120 via a data port "F" of the administrative interface. Administrative interface 120 will be described in greater detail hereinbelow in connection with FIG. 2.

Display 110 in FIG. 1 presents, in this embodiment of the invention, data to registered purchaser 100 relating to preestablished on-going product or service pools that the registered purchaser can join if the product or service desired to be purchased by the searching registered purchaser is identical or acceptably similar to the products specified in the existing pools. The display can also make available to the registered purchaser the status of the pools, including pools in which the registered purchaser may participate, as well as the registered purchasers' history in prior pools and status in on-going pools.

At such time as the registered purchaser has determined to purchase an item, a decision is made at function block 102 whether the product desired to be purchased is available in an existing on-going pool or whether a new pool of purchasers needs to be started. If the desired product is not available in any existing pool, then the parameters that define the product desired to be purchased are defined at function block 112, and this information is submitted to administrative interface 120 at a data port "B" of the administrative interface. As will be described below in connection with FIG. 2, a decision is made, with administrative authorization, whether to start a new product pool. This procedure continues until all products desired to be purchased by registered purchaser 100 are determined to be the proper subject of an existing pool, or a pool that has been authorized by system administration (not shown in this figure) to be formed. Additionally, in situations where the registered user desires to form an order comprised of multiple products, and the system administration determines that an adequate pool for one or more of such products in the order are not available in any existing pool and the formation of a pool on any such product is declined, then agreement is reached between the registered user and the system administration as to whether the registered user will place an order for the remaining product(s).

At such time as it is determined that all pools necessary for fulfillment of the registered purchaser's order are in existence or are agreed to be formed, the decision process proceeds to decision block 103, and associated function blocks 113 and 115, where database records are created responsive to the registered purchaser's order. More specifically, if it is determined that the order being placed by the registered purchaser can be accommodated in a single pool, then a single pool data record is created at function block 131. The single pool data is delivered to administrative interface 120 at a data port "C" of the administrative interface. On the other hand, if the order spans several pools, then a multiple pool data record is formed at function block 115. The multiple pool data is delivered to administrative interface 120 at a data port "D" of the administrative interface. As will be described below, the order placed by registered purchaser 100 is aggregated in appropriate pools with orders placed by other registered purchasers (not shown) and these aggregated orders are made available by way of purchase offers or by database access to responsive vendors 140, that communicate with administrative interface 120 via a data port "E." The administrators in the administrative interface will register vendors in an appropriate database (not shown in this figure) and determine whether a vendor that bids on a pool or a portion of a pool can reasonably be expected to fulfil the orders. That is, the bidding vendors are subjected to a prequalification and registration process.

At a predetermined time, the registered purchaser will enter into a contract whereby he or she is bound contractually to the order. Prior to that time, however, a change order request issued by the registered purchaser at function block 130 will be considered by the system administration in accordance with a mutually agreed policy. The change order request is provided to administrative interface 120 via a data port "G." Such policy will determine, for example, the procedures to be followed when a registered user desires to change a multi-pool order, particularly when one or more of the relevant pools have proceeded to a commitment stage.

Figure 2:
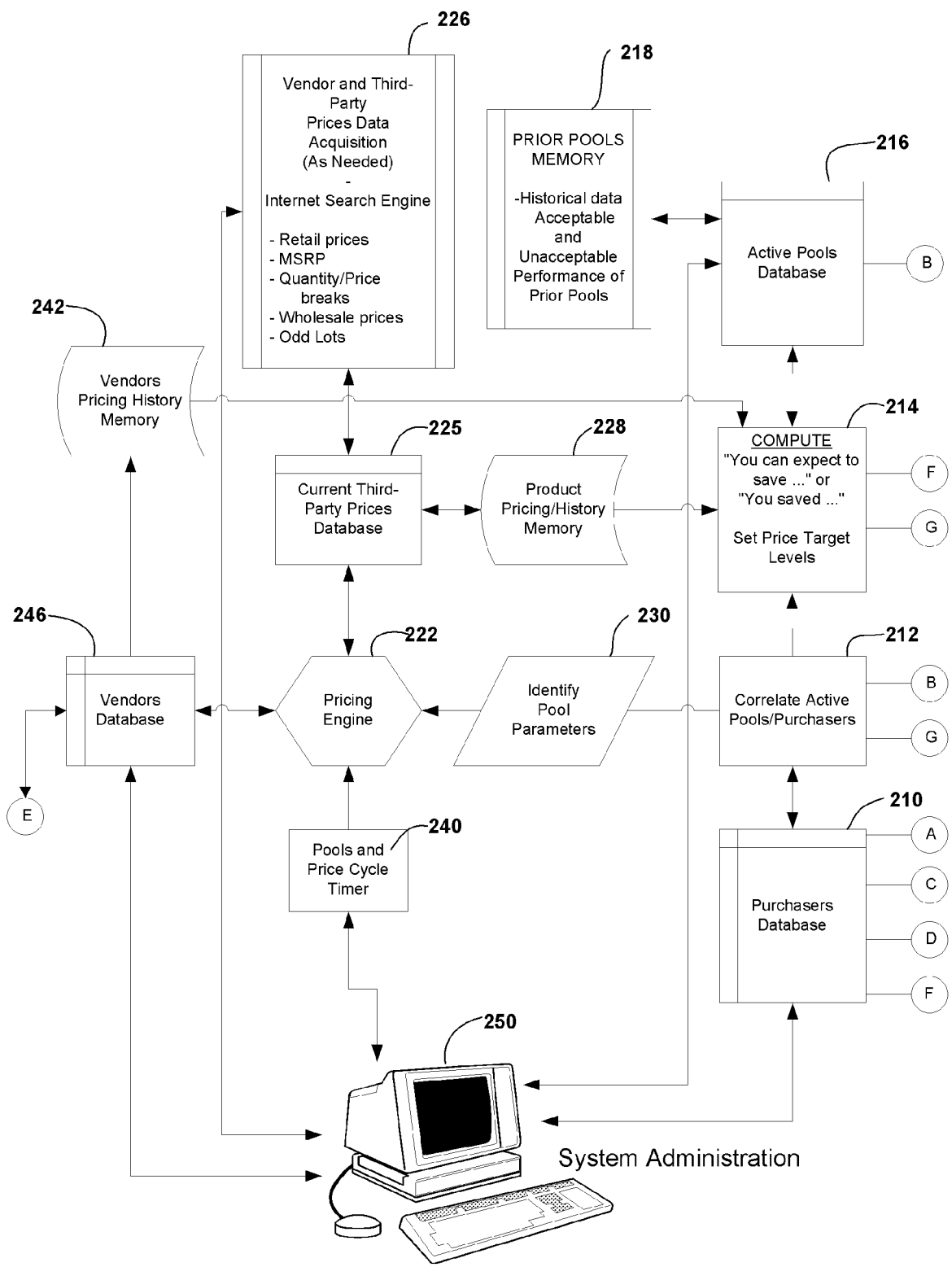
FIG. 2 is a simplified function block representation of a specific illustrative embodiment of the administrative interface portion of the embodiment of FIG. 1.

FIG. 2 is a simplified function block representation of a specific illustrative embodiment of administrative interface portion 120 of the embodiment of FIG. 1. As shown in FIG. 2, on the right hand side of this figure there are shown a plurality of input ports designated with capital letters "A," "B," "C," "D," "F," and "G," each in a circle, and on the left side of this figure there is shown an input port designated with capital letter "E" in a circle. Each of these input ports corresponds to an equivalently designated input port of administrative interface 120 as shown in FIG. 1.

Referring once again to FIG. 2, there are provided a plurality of databases, such as purchasers database 210, active pools database 216, and vendors database 246. All of these databases are monitored and controlled by a system administration that is generally designated 250. There is additionally provided a price data acquisition arrangement 226 that obtains pricing information from a variety of sources, including the internet. Such pricing information includes current retail prices, manufacturers suggested retail prices (MSRP), quantity/price breaks, wholesale prices, available odd lots, and their prices, etc. The pricing data obtained by prices data acquisition system 226 is stored in a current third party prices database 225. Historical prices are stored in product pricing/history memory 228. The old prices are useful to determine price trends and other market information that will enable the system administration to determine a commitment price.

Historical information is of value in enabling a pricing determination to be made at a pricing engine 222. Thus, for example, the history of prior pools that are now closed is stored in a prior pools memory 218. This information is useful to the system administration to determine whether the formation of a new pool (see, function block 112 in FIG. 1) has a likelihood of being successful. Similarly, pricing history information provided by vendors in vendors database 246 is stored in a vendors pricing history memory 242, and this information is useful in determining the likelihood of success of a new pool and enables the system administration to make a non-binding representation to registered purchaser 100 (not shown in this figure) of the amount that he or she can expect to save. All of this historical pricing information from prior pools (218), prior vendor bids (242), prior market prices (248), etc. when compared to existing market prices (225), enable the system administration to compute reasonably reliable expectations of savings (214) that will attract the registered purchaser to place his or her order with this system. In addition, prices data acquisition system 226 is, in certain embodiments, be capable of obtaining prices from on-line auction and other vendors that will enable presentation to the registered purchaser of the attractive historical performance of the present system.

In the practice of the invention, pools of aggregated purchaser orders are formed, the pools having varying operational characteristics. Some pools, for example, are created and have a finite pool life. The duration of the pool life is determined by pool and price cycle timer 240 which is controlled by system administration 250. Thus, any such pool will expire at a predetermined time, and its performance, as previously noted, is stored in prior pools memory 218. Other pools, however, are continuous in that a registered purchaser need not ever go through the process (102, 112) of causing creation of such a pool. Such continuous or standing pools, however, are subject to time-related cycles controlled by timer 240 that determine the period of time that a registered purchaser is in such a standing pool. The change order request of function block 130 is, in some embodiments, used to enable a registered purchaser to extend the effective pool cycle applicable to his or her order, in situations where such registered purchaser believes prices will continue to fall and his or her need of the product is not immediate. Additionally, when the product to be purchased by the registered purchaser is a quantity of a commodity, the change order function can be employed in certain embodiments to portions of the order. The correlation between active pools and purchasers, as well as change order requests for pool cycle extensions, is controlled at function block 212. The correlated active pools and purchasers data is further correlated to identified pool parameters at function block 230, which information is then made available to pricing engine 222. Timer 240 additionally controls the duration of a price cycle that will be used compute the expected savings at function block 214.

The pricing engine represented at function block 222 need not be entirely a computerized system. In some embodiments of the invention, human intervention is employed in the pricing process, illustratively under control of system administration 250.

Figure 3:
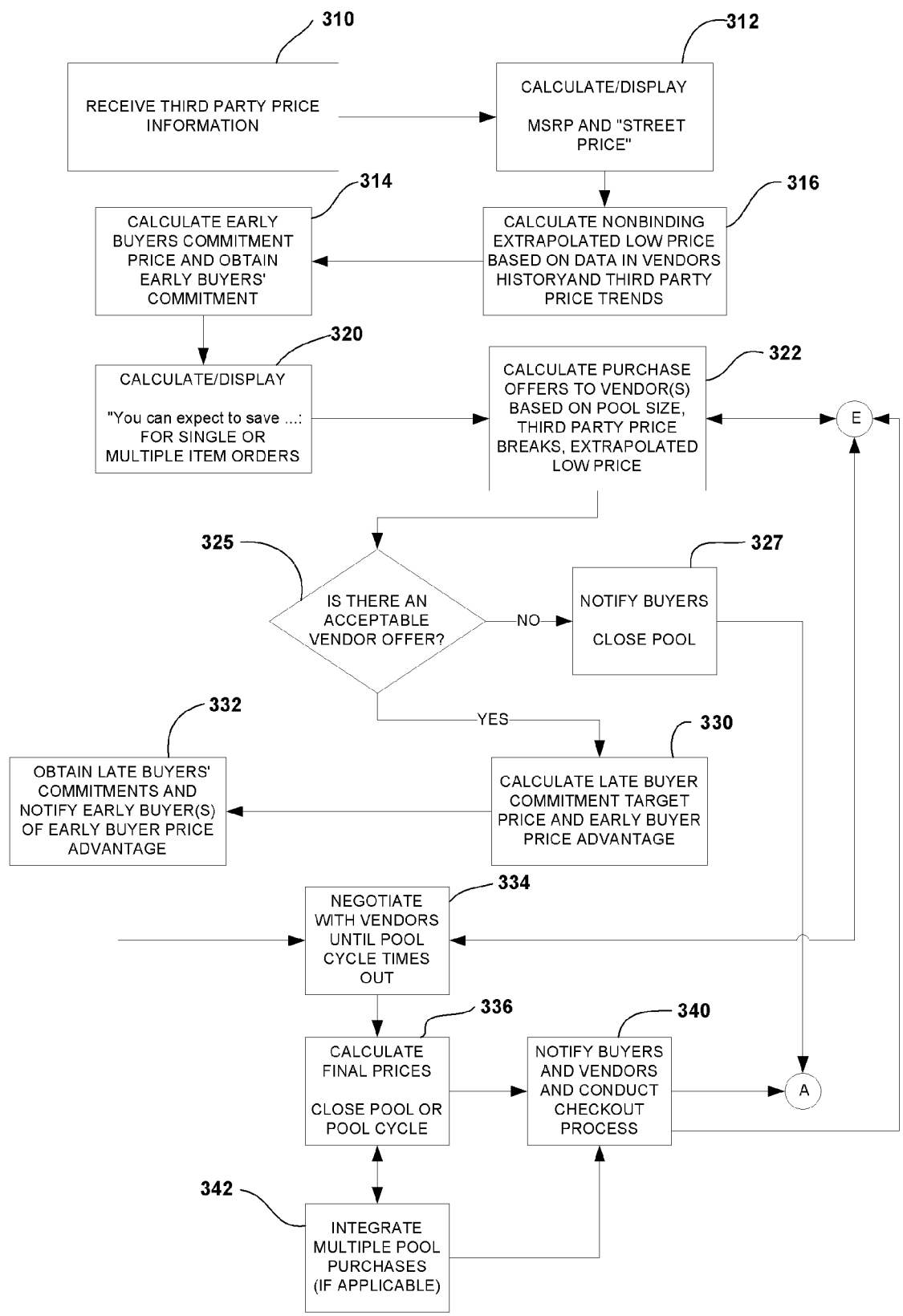
FIG. 3 is a simplified function block representation of a specific illustrative pricing process.

FIG. 3 is a simplified function block representation of a specific illustrative pricing process. As shown in this figure, third party price information is received at function block 310. Such information may be received via the vendor and third party prices data acquisition system 226 (not shown in this figure) MSRP and the retail (or "street") prices are calculated at function block 312 and displayed at system administration 250. In some embodiments, this information can be made available to registered purchaser 100 at display 110 in response to the computation of function block 214 (not shown in this figure). This specific embodiment of the invention then continues by calculating a non-binding extrapolated low price based on data obtained from vendors pricing history 242 (not shown in this figure) and including, in some embodiments, third party price trends calculated by pricing engine 222 (not shown in this figure) from information obtained from product pricing history memory 228 (not shown in this figure) and current third party prices database 225 (not shown in this figure) over a period of time determined by price cycle timer 240 (not shown in this figure).

In this specific embodiment, those registered purchasers that are in a pool in a non-binding manner prior to the formulation of a first commitment price are termed "early buyers." An early buyers commitment price is calculated at function block 314 based on the extrapolated low price and a predetermined reserve for the system that is determined at function block 316. The early buyers are then afforded an opportunity to remain in the pool by committing to purchase if the system can achieve a vendor offer that permits them to purchase at a purchase price that is at least as favorable as the early buyers commitment price. Such a purchase price is displayed to the registered purchaser at function block 320, which display may require reintegration of a multiple pool order using the correlation between the active pools and the purchasers in function block 212 (not shown in this figure). Thus, in this embodiment, a multiple pool order would be presented to the associated registered purchaser in an integrated fashion whereby the purchaser does not see the pricing for individual components for his or her order. In some respects, therefore, the pooling system of the present invention is transparent to the purchasers, except insofar as they may optionally be provided access to individual pools as discussed hereinabove in connection with the decision-making process of FIG. 1. The system administration will formulate policy regarding the extent to which the pooling system and the pools are viewable by the purchasers.

After the early purchasers have committed to purchase at the early buyers commitment price, as presented to them at function block 320, a purchase offer is calculated to vendors at function block 322. Function block 322 is shown to exchange data at input port "E" that is shown again on the left sides of FIGS. 1 and 2. The offer price is responsive, in certain embodiments, to the pool size (i.e., number of early buyers). More specifically, the offer price is in this embodiment responsive to the rate of accumulation of the early buyer over a determinable period of time. As noted above, the determinable period of time is established by pools and price cycle timer 240 (FIG. 2), and the time period, also as noted above, is in some embodiments determined by the formulation of a first commitment price. There are therefore several ways in which the time rate of accumulation of buyers in a pool can be determined. In addition, the offer price is responsive in some embodiments of the invention the third party price breaks, the extrapolated low price, etc. The offer is conveyed to the vendors at node E, which includes direct communication to vendors of requests for proposals, and direct access by vendors of database information. In this specific illustrative embodiment, active pool information can be made available to the vendors via pricing engine 222 and vendors database 246.

Following the offers to vendors, it is determined at decision block 325 whether there has been received an acceptable vendor offer. This decision may involve communication by the system administrators with targeted vendors, and possibly some negotiation that might involve raising the early buyers commitment price and obtaining revised commitments from the early buyers. If the system administrator determines that an acceptable vendor offer is not reasonably available, then the buyers are notified and the pool closed at function block 327. This may require recalculation or a revised commitment on the part of a registered purchaser that has placed an affected multiple pool order. However, if there is available an initial acceptable vendor offer, then a commitment price is calculated for purchasers who enter the pool after the commitment by the early buyers, such subsequent buyers being termed the "late buyers."

A commitment price is calculated for the late buyers and an early buyers price advantage at function block 330. The commitment price and the early buyers price advantage may, for example, be responsive to price reductions resulting from increased pool size. The late buyers' commitments are then obtained at the calculated late buyer commitment target price, and the early buyers are notified, in this embodiment, of a calculated early buyer price advantage. Such an advantage would stimulate early commitment and consequently produce in future pools a larger number of early buyers. Moreover, the number of early buyers might be increased in certain embodiments by conducting effective pool marketing on the part of the system administrator using information from prior pools memory 218, purchasers database 210, product pricing history memory 228, and current third party prices database 225.

Notwithstanding that some late buyers have committed to the late buyers commitment target price at function block 332, in a highly successful pool, additional late buyers will enter, thereby increasing the pool size. Such pool size increase, and the time rate of such pool size increase, coupled to trends that may be evident from the current third party prices database (225), enables continued negotiations with vendors at function block 334 until the pool or the pool cycle times out by operation of pool and price cycle timer 240. The information from price cycle timer 240 (FIG. 2) is provided to function block 334 via input port "E" that is shown again on the left sides of FIGS. 1 and 2. Upon expiration of the pool or pool cycle, the final prices are calculated at function block 336 and the pool or pool cycle is closed. The buyers and vendors are then notified at function block 340 and a check-out process is conducted. Function block 340 is shown to issue data to input ports "A" and "E." With respect to purchasers that have placed orders that span multiple pools, such pools are integrated at function block 342 in correlation with the associated purchasers (function block 212). Such purchasers of multi-pool orders are notified and checked-out at function block 340. Data responsive to the time rate at which buyers enter pools is stored in prior pools memory 218 (FIG. 2) and is useful to the system administration in promoting and managing future pools.

Figure 4:
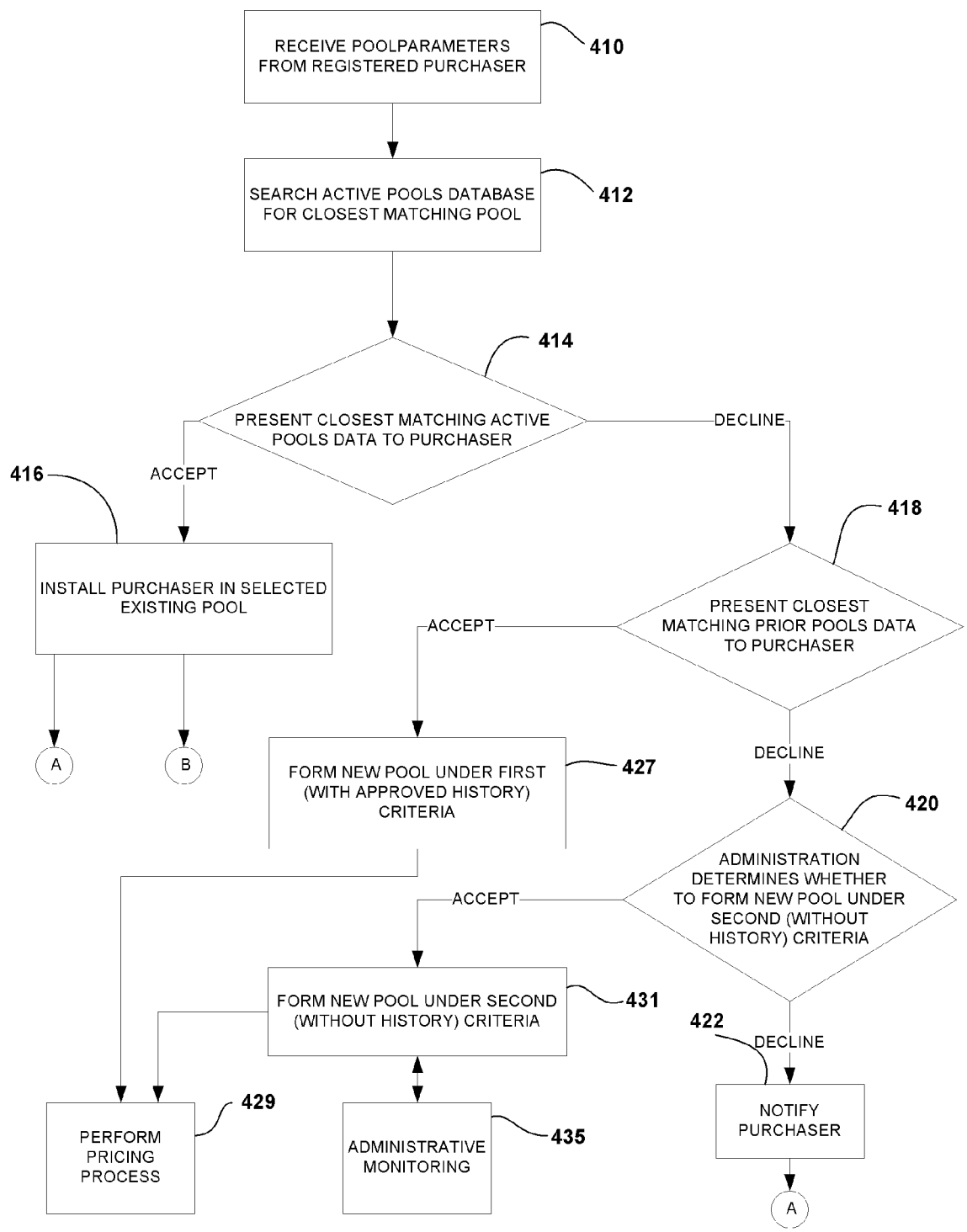
FIG. 4 is a is a simplified function block representation of a specific illustrative process for determining whether to form a purchaser pool.

FIG. 4 is a simplified block representation of a specific illustrative process for determining whether to form a purchaser pool. As shown, pool parameters from a registered purchaser are received at function block 410. Such parameters correspond to the information defined at function block 112 of FIG. 1. In FIG. 4, once the pool parameters are obtained a search is conducted at function block 412 to identify the closest matching pool in active pools database 216. Information relating to the closest matching pool is presented to registered purchaser 100 (not shown in this figure) and the acceptability of the closest matching pool to the purchaser is determined at decision function block 414. If the purchaser accepts to be included in the presented closest matching active pool, the purchaser is installed therein at function block 416, which is shown to exchange data at input terminals "A" and "B." On the other hand, if the purchaser deems the closest matching active pool to be unacceptable, a search is conducted, in some embodiments of the invention, of prior pools in prior pools memory 218 for the closest matching prior pool. If such a prior pool is acceptable to the purchaser, system administration 250 (FIG. 2) can determine at function block 427 to form a new active pool using the parameters of the acceptable prior pool, the decision being based in part on the historical performance of such a pool. Such a new pool, therefore, is formed under a first criteria that incorporates known historical performance of a same or similar pool. Upon the formation of the new pool, the pricing process is performed at function 429. In one embodiment, the pricing process will follow the procedure described in relation to FIG. 3.

In the event that the purchaser determines that the closest matching prior pool presented at function block 418 is unacceptable, the decision process proceeds to decision function block 420 wherein the administration determines whether to form a new pool under a second criteria, i.e., without the benefit of a known history. If the administrative judgment is such that the formation of a new pool without history is declined, the purchaser is notified at function block 422, via input port "A.". On the other hand, if the administration determines to form a new pool, such is formed at function block 431, and, the pricing process of function block 429 is performed. In all likelihood, the formation of a new pool under the second criteria will require administrative monitoring, such as at function block 435.

FIG. 5 is a simplified function block representation of a specific illustrative embodiment of the invention wherein a vendor is afforded an opportunity to enter a vendors pool or to cause formation of a new vendor pool. As shown in this figure, a vendor that has a product for sale, particularly in quantity, delivers at function block 510 parameters that define a vendor pool (product for sale) having certain product parameters associated therewith. These include, for example, identification of the product type, quantity available, and pricing information, including price breaks. At function block 512, a pre-existing vendor pools database (not shown) is searched to identify similar vendor pools, whereupon the vendor is afforded an opportunity at decision block 514 to join a pre-existing vendor pool. Such may be desirable to a vendor in situations where the product being offered for sale is generally purchased by vendors on a scale larger than the offering vendor's available inventory. The similar vendor pool is then disclosed to the offering vendor at function block 516, and the offering vendor is offered an opportunity to join the pre-existing vendor pool at function block 518.

If the vendor agrees to join such a pre-existing vendor pool, the offering vendor is installed therein at function block 522. On the other hand, if the offering vendor prefers to form a one-product one-vendor pool, such is formed at function block 520. The new pool is correlated in the vendors database at function block 524, via input port "E." Additionally, a corresponding purchaser pool is formed at function block 526 which can be joined as previously described by purchasers desiring to purchase all or some of the product of the offering vendor.

FIG. 6 is a simplified function block representation of a specific illustrative embodiment of the invention wherein a cost-of-bid price is determined as a function of the time rate of accumulation of database records. As shown in this figure, a product (not shown) that is desired to be purchased by a plurality of purchasers (not shown) is identified at function block 610. A reserve price for the product is determined at function block 612. In some embodiments of the invention, the reserve price is used to determine a minimum bid for the product. In some embodiments, the reserve price is selectably responsive to an acquisition cost of the product, and in other embodiments, to a price trend of an article similar to the product. Database records, each corresponding to a correlation between the product and a respective one of the purchasers, are produced and stored at function block 614.

The embodiment of FIG. 6 continues with the identification at function block 616 of a time rate at which the plurality of database records are accumulated in the database memory during performance of said step of producing and storing database records at function block of function block 614. A cost-of-bid price then is calculated at function block 618, which cost-of-bid price is determined as a function of the rate at which the database records are accumulated, and the cost-of-bid price is issued to the bidders at function block 620. As shown, in some embodiments of the invention the cost-of-bid price optionally is continually recalculated during the active period of the auction.

In a specific illustrative embodiment of the invention, the cost-of-bid price is increased in time as the auction progresses. This serves as incentive for bidders to place their bids early during the cycle of the auction. The rate of change of the cost-of-bid price is not necessarily fixed, but will, in some embodiments, vary with the rate of bidder activity during the auction cycle.

Although the invention has been described in terms of specific embodiments and applications, persons skilled in the art can, in light of this teaching, generate additional embodiments without exceeding the scope or departing from the spirit of the invention described herein. Accordingly, it is to be understood that the drawing and description in this disclosure are proffered to facilitate comprehension of the invention, and should not be construed to limit the scope thereof.

What is claimed is:

1. A method of transacting sales over a computerized network, the method comprising the steps of:
   storing in a computer purchasers database memory information corresponding to purchasers;
   defining a product desired to be purchased by at least one of the purchasers;
   computing a first cost-of-bid price;

producing a plurality of database records, each corresponding to a correlation between the product and a respective one of the purchasers;

accumulating the plurality of database records in a computer database memory;

computing, by a processor, a first time rate at which the plurality of database records are accumulated in the computer database memory during performance of said step of accumulating; and calculating a second cost-of-bid price responsive to the time rate identified in said step of computing a time rate.

2. The method of claim 1, wherein there are further provided the steps of:

computing a second time rate at which the plurality of further database records are accumulated in the computer database memory; and calculating a third cost-of-bid price responsive to the second time rate computed in said step of computing a second time rate.

3. The method of claim 1, wherein said step of computing a first cost-of-bid price is responsive to an historical sales performance.

4. The method of claim 1, wherein there is further provided the step of determining a reserve price responsive to an acquisition cost.

5. The method of claim 4, wherein said step of determining the reserve price is responsive to a price trend of an article similar to the product.

6. The method of claim 1, wherein there is provided the step of presenting a cost-of-bid price on a computer display to at least one of the purchasers.

\* \* \* \* \*